(12) United States Patent
Shen

(10) Patent No.: US 9,641,510 B2
(45) Date of Patent: *May 2, 2017

(54) CONTROL SYSTEM OPERABLE BY MOBILE DEVICES

(71) Applicant: I-Ting Shen, Tainan (TW)

(72) Inventor: I-Ting Shen, Tainan (TW)

( * ) Notice: Subject to any disclaimer, the term of this patent is extended or adjusted under 35 U.S.C. 154(b) by 41 days.

This patent is subject to a terminal disclaimer.

(21) Appl. No.: 14/876,877

(22) Filed: Oct. 7, 2015

(65) Prior Publication Data

US 2017/0078260 A1 Mar. 16, 2017

(30) Foreign Application Priority Data

Sep. 11, 2015 (TW) .............................. 104130202 A

(51) Int. Cl.
    *H04L 29/06* (2006.01)
(52) U.S. Cl.
    CPC .............. *H04L 63/08* (2013.01); *H04L 63/06* (2013.01); *H04L 63/10* (2013.01)
(58) Field of Classification Search
    CPC ....................................................... H04L 63/08
    See application file for complete search history.

(56) References Cited

U.S. PATENT DOCUMENTS

| | | | | |
|---|---|---|---|---|
| 9,058,702 | B2* | 6/2015 | Chao | G07C 9/00111 |
| 9,432,361 | B2* | 8/2016 | Mahaffey | H04L 63/0853 |
| 2005/0044404 | A1* | 2/2005 | Bhansali | G06F 21/572 |
| | | | | 726/26 |
| 2007/0289012 | A1* | 12/2007 | Baird | H04L 9/321 |
| | | | | 726/17 |
| 2015/0223067 | A1* | 8/2015 | Lowe | H04L 63/062 |
| | | | | 455/420 |
| 2016/0189503 | A1* | 6/2016 | Johnson | E05B 55/12 |
| | | | | 348/152 |
| 2016/0218884 | A1* | 7/2016 | Ebrom | D06F 33/02 |
| 2016/0379039 | A1* | 12/2016 | Dagan | G06K 9/00013 |
| | | | | 382/124 |

FOREIGN PATENT DOCUMENTS

| | | | | |
|---|---|---|---|---|
| KR | 20160035196 | A | * | 3/2016 |
| KR | 20160037454 | A | * | 4/2016 |
| KR | 20160042575 | A | * | 4/2016 |

* cited by examiner

*Primary Examiner* — Shawnchoy Rahman
(74) *Attorney, Agent, or Firm* — Alan D. Kamrath; Kamrath IP Lawfirm, P.A.

(57) ABSTRACT

A control system includes a control device, a controller, a plurality of user mobile devices, and a manager mobile device. An initial first identification information picked up by each user mobile device is sent to the manager mobile device, is authenticated, and is encoded together with a control device identification number corresponding to the control device. Every time a user mobile device is connected to the controller for opening the control device, a holder of the user mobile device is requested to input an instant first identification information. After decoding by a decoding key, the controller identifies whether the instant first identification information is identical to the authenticated initial first identification information and identifies whether the obtained control device identification number is identical to that of the control device. The identification result is used to decide whether the control device should be set to be an open state.

20 Claims, 2 Drawing Sheets

CONTROL SYSTEM OPERABLE BY MOBILE DEVICES

BACKGROUND

The present invention relates to a control system operable by mobile devices and, more particularly, to a control system using the Internet, a mobile communication network (such as 3G or 4G mobile communication network), a local area network, Bluetooth, radio frequency identification (RFID), or near field communication (NFC) to permit communication between a mobile device (such as a cell phone or a tablet) with an access control device, thereby permitting use of the mobile device to control unlocking of the access control device.

Conventional mechanical locks have been well developed, and metal keys are generally required to open most types of the mechanical locks, such that many people have to carry various keys for different locks and have to remember the corresponding lock of each key, which is inconvenient to carriage and use. With the progress of technology, conventional mechanical locks have been gradually developed to include motors or magnetically driven devices to activate the components of the locks while cooperating electrical identity identification processes to control locking or unlocking of the locks.

One type of the most commonly used electric locks uses radio frequency identification (RFID) technology to identify the identity of the user. Specifically, when the user carrying an induction card is near the electric lock, the electric lock reads an identification number stored in the induction card and compares the identification number of the induction card with a list of authorized identification numbers stored in the electric lock. If the identification number of the induction card matches with any one of the authorized identification numbers, the electric lock is unlocked. On the other hand, if the identification number of the induction card does not match with any one of the authorized identification numbers, the electric lock remains locked. It is obvious that the electric lock remains locked if the user is without an induction card. However, the electric lock cannot identify the holder of the induction card; namely, if the induction card is lost, anyone finding the induction card can use it to access the electric lock.

BRIEF SUMMARY

This need and other problems in the field of preventing unauthorized access are solved by providing a control system including a control device controllable to be in an open state or a locked state.

In a first aspect, a control system includes a control device controllable to be in an open state or a locked state. A controller includes a control module electrically connected to the control device, a main memory electrically connected to the control module, and a wireless transmission device electrically connected to the control module, a reset device electrically connected to the control module. The reset device is operable to reset the control module to a reset state. The control module controls the control device to be in the open state or the locked state. A decoding key and a control device identification number corresponding to the control device are stored in the main memory. The control system further includes a plurality of user mobile devices. An access program is installed in each of the plurality of user mobile devices. Each of the plurality of user mobile devices includes a first processor, a first memory electrically connected to the first processor, and a first wireless transmission module electrically connected to the first processor. Each of the plurality of user mobile devices further includes a first input device. The first input device is configured for electrical connection with the wireless transmission device. The control system further includes a manager mobile device. A management program is installed in the manager mobile device. The manager mobile device includes a second processor, a second memory electrically connected to the second processor, and a second wireless transmission module electrically connected to the second processor. An encoding key is stored in the second memory and corresponds to the decoding key. The second wireless transmission module is configured to permit connection with the wireless transmission device and is configured to permit connection with each of the first wireless transmission modules.

When each of the plurality of user mobile devices executes the access program for the first time, each of the plurality of user mobile devices requests a holder thereof to use the first input device thereof to input initial first identification information and permits the first wireless transmission module thereof to be connected to the wireless transmission device.

When the first wireless transmission module of one of the plurality of user mobile devices executing the access program is within a communication range of the wireless transmission device, the first wireless transmission module of the one of the plurality of user mobile devices is connected to the wireless transmission device.

When the first wireless transmission module of one of the plurality of user mobile devices executes the access program is outside of the communication range of the wireless transmission device, the first wireless transmission module of the one of the plurality of user mobile devices is not connected to the wireless transmission device.

When the manager mobile device is executing the management program and is within the communication range of the wireless transmission device, the second wireless transmission module is connected to the wireless transmission device.

When the manager mobile device is executing the management program and is outside of communication range of the wireless transmission device, the second wireless transmission module is not connected to the wireless transmission device.

When the manager mobile device is executing the access program and when one of the plurality of user mobile devices is executing the access program and is located outside of a communication range of the second wireless transmission module, the first wireless transmission module of the one of the plurality of user mobile devices is not connected to the second wireless transmission module.

When the control module is in the reset state and when the second wireless transmission module of the manager mobile device is in connection with the wireless transmission device, the manager mobile device is permitted to obtain the control device identification number in the main memory and to store the control device identification number in the second memory, and the manager mobile device obtains management authority.

When the control module is not in the reset state and when the second wireless transmission module of the manager mobile device is in connection with the wireless transmission device, the manager mobile device is not permitted to obtain the control device identification number in the main memory and is not permitted to store the control device identification number in the second memory.

When the first wireless transmission module of one of the plurality of user mobile devices is connected to the second wireless transmission module, the manager mobile device is permitted to obtain the initial first identification information of the connected user mobile device and executes an authentication procedure to generate an authenticated initial first identification information. The encoding key stored in the second memory is used to encode the authenticated initial first identification information and the control device identification number as first encoded information. The first encoded information is sent back to the connected user mobile device and is stored in the first memory of the connected user mobile device.

When the first wireless transmission module of each of the plurality of user mobile devices is not in connection with the second wireless transmission module, the manager mobile device is not permitted to obtain the initial first identification information of each of the plurality of user mobile devices.

Every time the first wireless transmission module of one of the plurality of user mobile devices is in connection with the wireless transmission device, the access program of the connected user mobile device requests the holder of the connected user mobile device to use the first input device to input an instant first identification information, and the control module obtains the first encoded information and the instant first identification information of the connected user mobile device.

When none of the first wireless transmission modules of the plurality of user mobile devices are in connection with the wireless transmission device, the control module is not permitted to obtain the first encoded information and the instant first identification information of each of the plurality of user mobile devices.

The control module is permitted to use the decoding key to decode the first encoded information, obtaining the authenticated initial first identification information contained in the first encoded information.

When the control module identifies that the authenticated initial first identification information of the connected user mobile device is identical to the instant first identification information and identifies that the control device identification number in the first encoded information is identical to the control device identification number in the main memory, the control module sets the control device to be in the open state.

When the control module identifies that the authenticated initial first identification information of the connected user mobile device is not identical to the instant first identification information or identifies that the control device identification number in the first encoded information is not identical to the control device identification number in the main memory, the control module sets the control device to be in the locked state.

The controller can further include a time module electrically connected to the control module. The time module provides a date and a time. When the control module is in the reset state and when the second wireless transmission module of the manager mobile device is in connection with the wireless transmission device, the manager mobile device and the time module are synchronized such that the time and the date of the time module are consistent with a time and a date of the manager mobile device.

The manager mobile device uses the encoding key to encode the authenticated initial first identification information, the control device identification number, an access permission start time, and an access permission end time as the first encoded information.

After the control module has obtained the first encoded information of the connected user mobile device and the instant first identification information, the decoding key is used to decode the first encoded information to obtain the authenticated initial first identification information, the control device identification number, the access permission start time, and the access permission end time contained in the first encoded information.

When the control module identifies that the authenticated initial first identification information of the connected user mobile device is identical to the instant first identification information, identifies that the time of the time module is between the access permission start time and the access permission end time, and identifies that the control device identification number in the first encoded information is identical to the control device identification number in the main memory, the control module sets the control device to be in the open state.

When the control module identifies that the authenticated initial first identification information of the connected user mobile device is not identical to the instant first identification information, identifies that the time of the time module is not between the access permission start time and the access permission end time, or identifies that the control device identification number in the first encoded information is not identical to the control device identification number in the main memory, the control module sets the control device to be in the locked state.

Each of the plurality of user mobile devices can have a first hardware identification number. The first hardware identification numbers of the plurality of user mobile devices are different from each other.

When the first wireless transmission module of one of the plurality of user mobile devices is in connection with the second wireless transmission module, the manager mobile device is permitted to obtain the first hardware identification number and the initial first identification information of the connected user mobile device. The manager mobile device executes the authentication procedure to generate an authenticated first hardware identification number and authenticated initial first identification information. The encoding key is used to encode the authenticated first hardware identification number, the control device identification number, and the authenticated initial first identification information as the first encoded information.

Every time one of the user mobile devices executes the access program and is in connection with the wireless transmission device and the first wireless transmission module, the access program obtains the instant first hardware identification number of the connected user mobile device.

When none of the first wireless transmission modules of the plurality of user mobile devices are in connection with the second wireless transmission module, the manager mobile device is not permitted to obtain the initial first identification information and the first hardware identification number of each of the plurality of user mobile devices.

When the first wireless transmission module of one of the plurality of user mobile devices is in connection with the wireless transmission device, the control module is permitted to obtain an instant first hardware identification number of the connected user mobile device.

When none of the first wireless transmission modules of the plurality of user mobile devices are in connection with the wireless transmission device, the control module is not permitted to obtain the instant first hardware identification number of each of the plurality of user mobile devices.

When the control module identifies that the authenticated initial first identification information of the connected user mobile device is identical to the instant first identification information, identifies that the authenticated first hardware identification number of the connected user mobile device is identical to the instant first hardware identification number, and identifies that the control device identification number in the first encoded information is identical to the control device identification number in the main memory, the control module sets the control device to be in the open state.

When the control module identifies that the authenticated initial first identification information of the connected user mobile device is not identical to the instant first identification information, identifies that the authenticated first hardware identification number of the connected user mobile device is not identical to the instant first hardware identification number, or identifies that the control device identification number in the first encoded information is not identical to the control device identification number in the main memory, the control module sets the control device to be in the locked state.

When the second wireless transmission module of the manager mobile device is in connection with the wireless transmission device, the manager mobile device is permitted to send the first hardware identification number of selected at least one of the plurality of user mobile devices to the main memory and is permitted to store the first hardware identification number of the selected at least one of the plurality of user mobile devices in the main memory to establish a black list.

When the control module obtains the first encoded information and the instant first hardware identification number of one of the selected at least one of the plurality of user mobile devices, the control module identifies whether the instant first hardware identification number is in the black list.

When the instant first hardware identification number of the one of the selected at least one of the plurality of user mobile devices is in the black list, the control module does not use the decoding key to decode the first encoded information of the one of the plurality of user mobile devices, and the control device is in the locked state.

When instant first hardware identification number of the one of the selected at least one of the plurality of user mobile devices is not in the black list, the control module 34 uses the decoding key to decode the first encoded information.

The manager mobile device can include a second hardware identification number. The manager mobile device can further include a second input device electrically connected to the second processor. When the manager mobile device executes the management program for the first time, a manager using the manager mobile device is requested to use the second input device to input an initial second hardware identification number, the manager mobile device executes an authentication procedure to generate authenticated initial second identification information and an authenticated second hardware identification number, and the encoding key is used to encode the authenticated initial second identification information, the control device identification number, and the authenticated second hardware identification number as second encoded information, Every time the second wireless transmission module of the manager mobile device is connected to the wireless transmission device of the controller, the management program of the manager mobile device requests a holder of the manager mobile device to use the second input device to input an instant second identification information and picks up an instant second hardware identification number of the connected manager mobile device, and the control module is permitted to obtain the second encoded information, the instant second hardware identification number, and the instant second identification information.

After the control module has obtained the second encoded information, the second hardware identification number, and the second identification information of the manager mobile device, the decoding key is used to decode the second encoded information to obtain the authenticated second hardware identification number, the control device identification number, and the authenticated initial second identification information contained in the second encoded information.

When the control module identifies that the authenticated second hardware identification number of the manager mobile device is identical to the instant second hardware identification number, identifies that the authenticated initial second identification information is identical to the instant second identification information of the manager mobile device, and identifies that the control device identification number in the first encoded information is identical to the control device identification number in the main memory, the control module sets the control device to be in the open state, and When the control module identifies that the authenticated second hardware identification number of the manager mobile device is not identical to the instant second hardware identification number, identifies that the authenticated initial second identification information is not identical to the instant second identification information of the manager mobile device, or identifies that the control device identification number in the first encoded information is not identical to the control device identification number in the main memory, the control module sets the control device to be in the locked state.

In a second aspect, a control system includes a plurality of control devices each controllable to be in an open state or a locked state and a plurality of controllers. Each of the plurality of controllers includes a control module electrically connected to one of the plurality of control devices, a main memory electrically connected to the control module, a wireless transmission device electrically connected to the control module, and a reset device electrically connected to the control module and operable to reset the control module to a reset state. Each control module controls one of the plurality of control devices to be in the open state or the locked state. A decoding key and a control device identification number corresponding to one of the plurality of control devices are stored in the main memory of a corresponding one of the plurality of controllers. The control system further includes a plurality of user mobile devices. An access program is installed in each of the plurality of user mobile devices. Each of the plurality of user mobile devices includes a first processor, a first memory electrically connected to the first processor, and a first wireless transmission module electrically connected to the first processor. Each of the plurality of user mobile devices further includes a first input device configured for electrical connection with the wireless transmission device. The control system further includes a manager mobile device. A management program is installed in the manager mobile device. The manager mobile device includes a second processor, a second memory electrically connected to the second processor, and a second wireless transmission module electrically connected to the second processor. An encoding key is stored in the second memory and corresponds to the decoding key. The second wireless transmission module is configured to permit connection with each wireless transmission device and is configured to permit connection with each first wireless transmission module.

When each of the plurality of user mobile devices is executing the access program for the first time, each of the plurality of user mobile devices requests a holder thereof to use the first input device thereof to input an initial first identification information and permits the first wireless transmission module thereof to be connected to the wireless transmission device of a corresponding one of the plurality of controllers.

When the first wireless transmission module of at least one of the plurality of user mobile devices executing the access program is within a communication range of the wireless transmission device of one of the plurality of controllers, the first wireless transmission module of the at least one of the plurality of user mobile devices is connected to the wireless transmission device of the one of the plurality of controller.

When the first wireless transmission module of one of the plurality of user mobile devices executing the access program is outside of the communication ranges of the wireless transmission devices of all of the plurality of controllers, the first wireless transmission module is not connected to the wireless transmission device of the one of the plurality of controllers.

When the manager mobile device is executing the management program and is within the communication range of the wireless transmission device of at least one of the plurality of controllers, the second wireless transmission module is connected to the wireless transmission device of the at least one of the plurality of controllers.

When the manager mobile device is executing the management program and is outside of communication ranges of the wireless transmission devices of all of the plurality of controllers, the second wireless transmission module is not connected to the wireless transmission devices of the plurality of controllers.

When the manager mobile device is executing the access program and when one of the plurality of user mobile devices is executing the access program and is located outside of a communication range of the second wireless transmission module, the first wireless transmission module of the one of the plurality of user mobile devices is not connected to the second wireless transmission module.

When the second wireless transmission module of the manager mobile device is in connection with the wireless transmission device of one of the plurality of controllers whose control module is in the reset state, the manager mobile device is permitted to obtain the control device identification number in the main memory of the connected controller and to store the control device identification number in the second memory, and the manager mobile device obtains management authority over the connected controller.

When the second wireless transmission module of the manager mobile device is in connection with the wireless transmission device of one of the plurality of controllers whose control module is not in the reset state, the manager mobile device is not permitted to obtain the control device identification number in the main memory of the connected controller and is not permitted to store the control device identification number in the second memory.

When the first wireless transmission module of one of the plurality of user mobile devices is connected to the second wireless transmission module, the manager mobile device is permitted to obtain the initial first identification information of the connected user mobile device and executes an authentication procedure to generate authenticated initial first identification information. The encoding key stored in the second memory is used to encode the authenticated initial first identification information and the control device identification number as first encoded information. The first encoded information is sent back to the connected user mobile device and is stored in the first memory of the connected user mobile device.

When the first wireless transmission module of each of the plurality of user mobile devices is not in connection with the second wireless transmission module, the manager mobile device is not permitted to obtain the initial first identification information of each of the plurality of user mobile devices.

Every time the first wireless transmission module of one of the plurality of user mobile devices is in connection with the wireless transmission device of one of the plurality of controllers, the access program of the connected user mobile device requests the holder of the connected user mobile device to use the first input device thereof to input instant first identification information, and the control module of the connected controller obtains the first encoded information and the instant first identification information of the connected user mobile device.

When none of the first wireless transmission modules of the plurality of user mobile devices are in connection with the wireless transmission device of the plurality of controllers, the control module of each of the plurality of controllers is not permitted to obtain the first encoded information and the instant first identification information of each of the plurality of user mobile devices.

The control module of each of the connected controllers is permitted to use the decoding key to decode the first encoded information, obtaining the authenticated initial first identification information contained in the first encoded information.

When the control module of each of the connected controllers identifies that the authenticated initial first identification information of the connected user mobile device is identical to the instant first identification information and identifies that the control device identification number in the first encoded information is identical to the control device identification number in the main memory, the control module of each of the connected controllers sets the correspondingly connected control device to be in the open state.

When the control module of each of the connected controllers identifies that the authenticated initial first identification information of the connected user mobile device is not identical to the instant first identification information or identifies that the control device identification number in the first encoded information is not identical to the control device identification number in the main memory, the control module of each of the connected controllers sets the correspondingly connected control device to be in the locked state.

In a third aspect, a control system includes a plurality of control devices each controllable to be in an open state or a locked state and a plurality of controllers. Each of the plurality of controllers includes a control module electrically connected to one of the plurality of control devices, a main memory electrically connected to the control module, a wireless transmission device electrically connected to the control module, and a reset device electrically connected to the control module and operable to reset the control module to a reset state. Each control module controls one of the plurality of control devices to be in the open state or the locked state. A decoding key and a control device identification number corresponding to one of the plurality of control devices are stored in the main memory of a corresponding one of the plurality of controllers. The control system further includes a plurality of user mobile devices. An access program is installed in each of the plurality of user mobile devices. Each of the plurality of user mobile devices includes a first processor, a first memory electrically connected to the first processor, and a first wireless transmission module electrically connected to the first processor. Each of the plurality of user mobile devices further includes a first input device configured for electrical connection with the wireless transmission device. The control system further includes a manager mobile device. A management program is installed in the manager mobile device. The manager mobile device includes a second processor, a second memory electrically connected to the second processor, and a second wireless transmission module electrically connected to the second processor. An encoding key is stored in the second memory and corresponds to the decoding key. The second wireless transmission module is configured to permit connection with each wireless transmission device and is configured to permit connection with each first wireless transmission module.

When each of the plurality of user mobile devices executes the access program for the first time, each of the plurality of user mobile devices requests a holder thereof to use the first input device thereof to input an initial first identification information and permits the first wireless transmission module thereof to be connected to the wireless transmission device of a corresponding one of the plurality of controllers.

When the first wireless transmission module of at least one of the plurality of user mobile devices executing the access program is within a communication range of the wireless transmission device of one of the plurality of controllers, the first wireless transmission module of the at least one of the plurality of user mobile devices is connected to the wireless transmission device of the one of the plurality of controller.

When the first wireless transmission module of one of the plurality of user mobile devices executing the access program is outside of the communication ranges of the wireless transmission devices of all of the plurality of controllers, the first wireless transmission module is not connected to the wireless transmission device of the one of the plurality of controllers.

When the manager mobile device is executing the management program and is within the communication range of the wireless transmission device of at least one of the plurality of controllers, the second wireless transmission module is connected to the wireless transmission device of the at least one of the plurality of controllers.

When the manager mobile device is executing the management program and is outside of communication ranges of the wireless transmission devices of all of the plurality of controllers, the second wireless transmission module is not connected to the wireless transmission devices of the plurality of controllers.

When the manager mobile device executing the access program and when one of the plurality of user mobile devices is executing the access program and is located outside of a communication range of the second wireless transmission module, the first wireless transmission module of the one of the plurality of user mobile devices is not connected to the second wireless transmission module.

When the second wireless transmission module of the manager mobile device is in connection with the wireless transmission device of one of the plurality of controllers whose control module is in the reset state, the manager mobile device is permitted to obtain the control device identification number in the main memory of the connected controller and is permitted to store the control device identification number in the second memory, and the manager mobile device obtains management authority over the connected controller.

When the second wireless transmission module of the manager mobile device is in connection with the wireless transmission device of one of the plurality of controllers whose control module is not in the reset state, the manager mobile device is not permitted to obtain the control device identification number in the main memory of the connected controller and is not permitted to store the control device identification number in the second memory.

When the first wireless transmission module of one of the plurality of user mobile devices is connected to the second wireless transmission module, the manager mobile device is permitted to obtain the initial first identification information of the connected user mobile device and executes an authentication procedure to generate authenticated initial first identification information. The encoding key stored in the second memory is used to encode the authenticated initial first identification information and the control device identification number as first encoded information. The first encoded information is sent back to the connected user mobile device and is stored in the first memory of the connected user mobile device.

When the first wireless transmission module of each of the plurality of user mobile devices is not in connection with the second wireless transmission module, the manager mobile device is not permitted to obtain the initial first identification information of each of the plurality of user mobile devices.

Every time the first wireless transmission module of one of the plurality of user mobile devices is in connection with the wireless transmission device of one of the plurality of controllers, the access program of the connected user mobile device requests the holder of the connected user mobile device to use the first input device thereof to input instant first identification information, and the control module of the connected controller obtains the first encoded information and the instant first identification information of the connected user mobile device.

When none of the first wireless transmission modules of the plurality of user mobile devices are in connection with the wireless transmission device of the plurality of controllers, the control module of each of the plurality of controllers is not permitted to obtain the first encoded information and the instant first identification information of each of the plurality of user mobile devices.

When the control module of each of the connected controllers is permitted to use the decoding key to decode the first encoded information, obtaining the authenticated initial first identification information contained in the first encoded information.

When the control module of each of the connected controllers identifies that the authenticated initial first identification information of the connected user mobile device is identical to the instant first identification information and identifies that the control device identification number in the first encoded information is identical to the control device identification number in the main memory, the control module of each of the connected controllers sets the correspondingly connected control device to be in the open state.

When the control module of each of the connected controllers identifies that the authenticated initial first identification information of the connected user mobile device is not identical to the instant first identification information or identifies that the control device identification number in the first encoded information is not identical to the control device identification number in the main memory, the control module of each of the connected controllers sets the correspondingly connected control device to be in the locked state.

Illustrative embodiments will become clearer in light of the following detailed description described in connection with the drawing.

DETAILED DESCRIPTION

Figure 1:
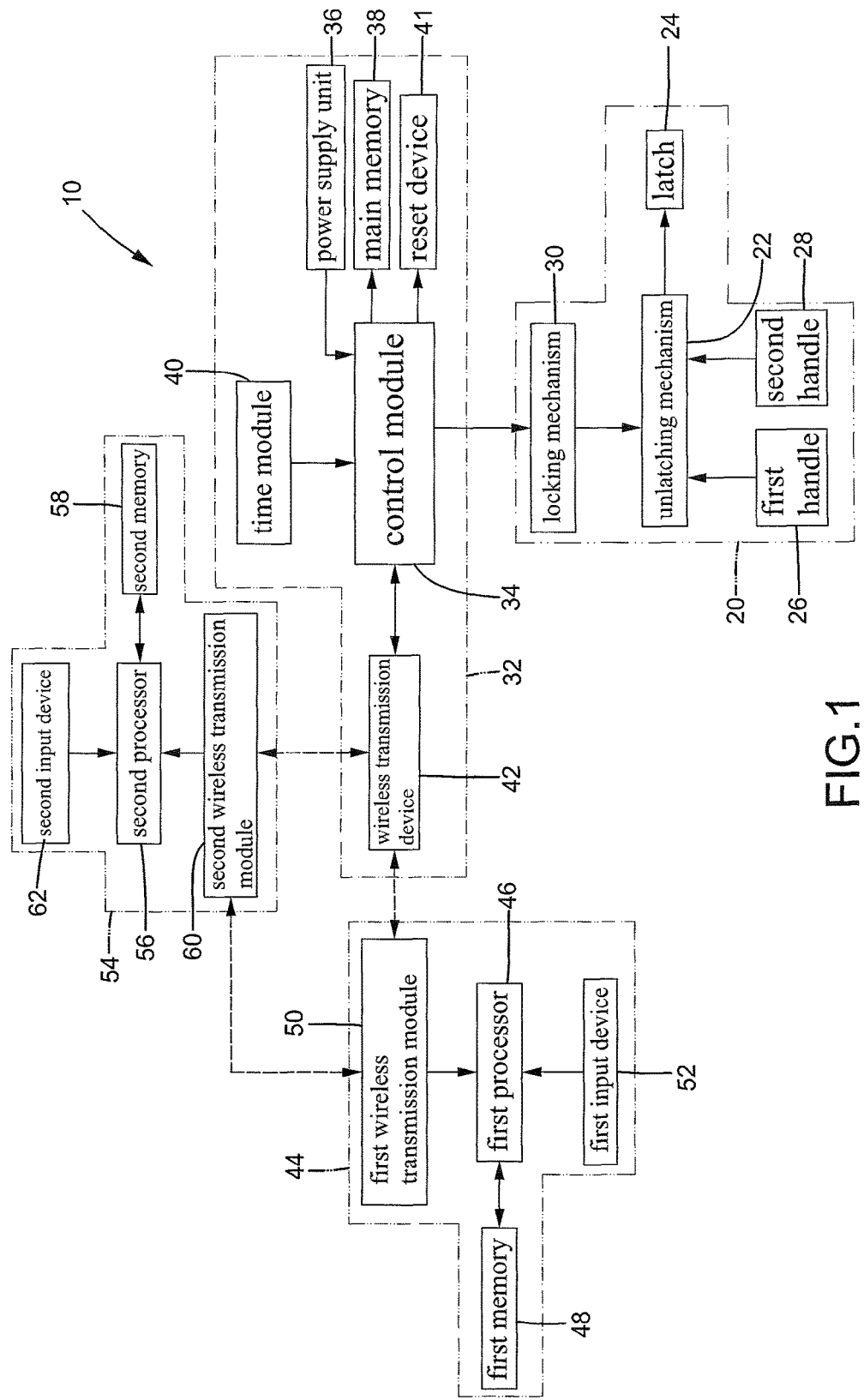
FIG. 1 is a diagrammatic block diagram of a control system according to the present invention.

With reference to FIG. 1, a control system 10 operable by mobile devices includes a control device 20. Control system 10 has a wide range of applications. For example, in a case that control system 10 is used for controlling access to a door or a passage, control device 20 can be a door lock, or an electric door (such as an electric glass door or an electric roller shutter in a bazaar) and a driving device of the electric door, or a gate of a parking lot, Mass Rapid Transit, or a platform of a train station. In another case that control system 10 is used in preventing theft of articles, control device 20 can be a lock mounted on the article, such as a lock for a safe, a bicycle, an automobile, or a motorcycle. Control system 10 will now be set forth by way of example of controlling access to a door.

Control system 10 further includes a controller 32, a plurality of user mobile devices 44, and a manager mobile device 54. Each user mobile device 44 and manager mobile device 54 can be connected to controller 32.

Control device 20 includes a door lock mounted to a door. Control device 20 can include a locking mechanism 30, an unlatching mechanism 22 operably connected to locking mechanism 30, a latch 24 operably connected to unlatching mechanism 22, and first and second handles 26 and 28 operably connected to unlatching mechanism 22. Latch 24 is movable between a latching position outside of the door and an unlatching position retracted into the door. When locking mechanism 30 is controlled to be in a locking state, latch 24 is prohibited from moving from the latching position to the unlatching position. In this case, control device 20 is set to be in the locked state. On the other hand, when locking mechanism 30 is controlled to be in an unlocking state, latch 24 is permitted to move from the latching position to the unlatching position. In this case, control device 20 is set to be in an open state.

Controller 32 includes a control module 34 electrically connected to locking mechanism 30. A main memory 38 is electrically connected to control module 34. A decoding key and a control device identification number corresponding to control device 20 are stored in main memory 38. Controller 32 further includes a wireless transmission device 42 electrically connected to control module 34 and a time module 40 electrically connected to control module 34. Wireless transmission module 42 can use Bluetooth, radio frequency identification (RFID), or near field communication (NFC). Time module 40 can be used to calculate the date and time and can be set to be identical to the local time. Thus, control module 34 can read the date and time from time module 40.

Furthermore, controller 32 further includes a reset device 41 electrically connected to control module 34. Reset device 41 is used to reset corresponding settings of control module 34 and to clear information in main memory 38 except the control device identification number. Reset device 41 can be concealed in controller 32 to avoid inadvertent reset of controller 32. In an example, reset device 41 is in the form of a button. Furthermore, a power supply unit 36 is electrically connected to control module 34 to provide control module 34 with electricity required for operation and to provide electricity to main memory 38, time module 40, and wireless transmission device 42 through control module 34.

Each user mobile device 44 can be a cell phone, a wearable device (such as smartglasses or a smartwatch), a tablet, or a notebook. Each user mobile device 44 includes a first processor 46, a first memory 48 electrically connected to first processor 46, a first wireless transmission module 50 electrically connected to first processor 46, and a first input device 52 electrically connected to first processor 46. First wireless transmission module 50 can use Bluetooth, radio frequency identification (RFID), or near field communication (NFC). Furthermore, each user mobile device 44 includes a first hardware identification number, such as an international mobile equipment identity (IMEI). The first hardware identification numbers of the user mobile devices 44 are different from one another. An access program is downloaded to and installed in each user mobile device 44. Execution of the access program permits each user mobile device 44 to be connected to wireless transmission device 42 via first wireless transmission module 50 and controller 32.

Furthermore, first input device 52 of each user mobile device 44 can be an image pick-up device, a microphone, a fingerprint input device, a finger vein recognition device, an iris recognition device, a touch screen, or a combination thereof. Execution of the access program permits use of first input device 52 to input a first identification information. In a case that first input device 52 is an image pick-up device, a holder of user mobile device 44 will be requested to use the image pick-up device to pick up the facial image of the holder of user mobile device 44, and the characteristics of the facial image of the holder of user mobile device 44 are encoded to be used as the first identification information. In another case that first input device 52 is a microphone, the holder of user mobile device 44 will be requested to use the microphone to pick up the voice of the holder of user mobile device 44, and the voice of the holder of user mobile device 44 is edited as a vocal print which is used as the first identification information. In a further case that first input device 52 is a fingerprint input device, the holder of user mobile device 44 will be requested to use the fingerprint input device to pick up the fingerprint of the holder of user mobile device 44, and the characteristics of the fingerprint are encoded to be used as the first identification information. In still another case that first input device 52 is a finger vein recognition device, the holder of user mobile device 44 will be requested to use the finger vein recognition device to pick up the finger vein image of the holder of user mobile device 44, and the characteristics of the finger vein image of the holder of user mobile device 44 are encoded to be used as the first identification information. In yet another example that first input device 52 is an iris recognition device, the holder of user mobile device 44 will be requested to use the iris recognition device to pick up the iris image of the holder of user mobile device 44, and the characteristics of the iris image of the holder of user mobile device 44 are encoded to be used as the first identification number. In still another example that first input device 52 is a touch screen, the holder of user mobile device 44 will be requested to use the touch screen to input the pin number or the specific figure of the holder of user mobile device 44, and the pin number or the specific figure of the holder of user mobile device 44 is used as the first identification number.

Manager mobile device 54 can be a cell phone, a wearable device (such as smartglasses or a smartwatch), a tablet, or a notebook. Manager mobile device 54 includes a second processor 56, a second memory 58 electrically connected to second processor 56, a second wireless transmission module 60 electrically connected to second processor 56, and a second input device 62 electrically connected to second processor 56. Second wireless transmission module 60 can use Bluetooth, radio frequency identification (RFID), or near field communication (NFC). A management program is downloaded into and installed in manager mobile device 54. Execution of the management program permits manager mobile device 54 to connect with wireless transmission device 42 of controller 32 via second wireless transmission module 60. Furthermore, manager mobile device 54 has a unique second hardware identification number, such as an international mobile equipment identity (IMEI).

Furthermore, second input device 62 of manager mobile device 54 can be an image pick-up device, a microphone, a fingerprint input device, a finger vein recognition device, an iris recognition device, a touch screen, or a combination thereof. Execution of the access program permits use of second input device 62 to input a second identification information. In a case that second input device 62 is an image pick-up device, a holder of manager mobile device 54 will be requested to use the image pick-up device to pick up the facial image of the holder of manager mobile device 54, and the characteristics of the facial image are encoded to be used as the second identification information. In another case that second input device 62 is a microphone, the holder of manager mobile device 54 will be requested to use the microphone to pick up the voice of the holder of manager mobile device 54, and the voice of the holder of manager mobile device 54 is edited as a vocal print which is used as the second identification information. In a further case that second input device 62 is a fingerprint input device, the holder of manager mobile device 54 will be requested to use the fingerprint input device to pick up the fingerprint of the holder of manager mobile device 54, and the characteristics of the fingerprint of the holder of manager mobile device 54 are encoded to be used as the second identification information. In still another case that second input device 62 is a finger vein recognition device, the holder of manager mobile device 54 will be requested to use the finger vein recognition device to pick up the finger vein image of the holder of manager mobile device 54, and the characteristics of the finger vein image of the holder of manager mobile device 54 are encoded to be used as the second identification information. In yet another example that second input device 62 is an iris recognition device, the holder of manager mobile device 54 will be requested to use the iris recognition device to pick up the iris image of the holder of manager mobile device 54, and the characteristics of the iris image of the holder of manager mobile device 54 are encoded to be used as the second identification number. In still another example that second input device 62 is a touch screen, the holder of manager mobile device 54 will be requested to use the touch screen to input the pin number or the specific figure of the holder of manager mobile device 54, and the pin number or the specific figure of the holder of manager mobile device 54 is used as the second identification number.

Now that the basic construction of control system 10 has been explained, the operation and some of the advantages of control system 10 can be set forth and appreciated. In particular, for the sake of explanation, it will be assumed that control system 10 is used for the first time. Locking mechanism 30 is preset in the locking state. Latch 24 is in the latching position and cannot be moved to the unlatching position. Thus, control device 20 is set to be in the locked state. Furthermore, it will be assumed that first and second input devices 52 and 62 are image pick-up devices.

In the first use, each user mobile device 44 executes the access program for the first time, and the execution program requests the holder of user mobile device 44 to use first input device 52 to input the facial image of the holder of user mobile device 44, and the characteristics of the facial image of the holder of user mobile device 44 are encoded to be used as an initial first identification information.

A housing of controller 32 is removed to expose reset device 41. Reset device 41 is operated to change controller 32 to the reset state. Then, manager mobile device 54 is executed. Specifically, when manager mobile device 54 executes the management program for the first time, an encoding key is generated by the management program and is stored in second memory 58. Furthermore, manager mobile device 54 uses the management program to connect with wireless transmission device 42 of controller 32 via second wireless transverse module 60. Thus, manager mobile device 54 connected to controller 32 in the reset state can obtain the control device identification number and can store the control device identification number into second memory 58 of manager mobile device 54. Furthermore, manager mobile device 54 sends the encoding key to controller 32 to match with the decoding key and stores the encoding key in the main memory 38. Furthermore, the time of time module 40 of controller 32 and the time of manager mobile device 54 are synchronized. Namely, the time and date (the clock time) of manager mobile device 54 are consistent with the time and date (the clock time) of time module 40 of controller 32. Thus, manager mobile device 54 obtains the management authority of controller 32 and sets controller 32 to be in a non-reset state. Furthermore, when the management program is executed for the first time, the management program requests the holder of manager mobile device 54 to use second input device 62 to pick up the facial image of the holder of manager mobile device 54, and the characteristics of the facial image are encoded to form an initial second identification information. Furthermore, when the management program is executed for the first time, manager using manager mobile device 54 will pick up an initial second hardware identification number (e.g., the IMEI) of manager mobile device 54 for authentication purposes. The initial second hardware identification number is stored in second memory 58.

Manager mobile device 54 can grant access authority to each user mobile device 44. When manager mobile device 54 is executing the management program and when at least one user mobile device 44 is executing the access program, if the at least one mobile device 44 is within the communication range of second wireless transmission module 60 of manager mobile device 54, manager mobile device 54 and the at least one user mobile device 44 can be connected to each other via first and second wireless transmission modules 50 and 60.

Note that each user mobile device 44 and manager mobile device 54 are not limited to direct, mutual connection. Namely, if each user mobile device 44 is using the Internet, a mobile communication network (such as 3G or 4G mobile communication network), or a local area network, manager mobile device 54 can be connected to the Internet, the mobile communication network, or the local area network, such that each user mobile device 44 and manager mobile device 54 can be connected with each other via the Internet, the mobile communication network, or the local area network even if each user mobile device 44 is not within the communication range of second wireless transmission module 60.

On the other hand, if none of user mobile devices 44 are within the communication range of second wireless transverse module 60 of manager mobile device 54, nor any user mobile device 44 is using the Internet, the mobile communication network, or the local area network, manager mobile device 54 cannot be connected to any user mobile device 44 via first wireless transmission module 50 and second wireless transmission module 60, regardless of execution of the access program and the management program.

A user mobile device 44 connected to manager mobile device 54 permits the initial first identification information and the first hardware identification number to be sent to manager mobile device 54 together. Note that after the user mobile device 44 has transmitted the initial first identification information to manager mobile device 54, the initial first identification information is deleted from the user mobile device 44. Namely, first memory 48 of the user mobile device 44 does not always keep the initial first identification information. Manager mobile device 54 proceeds with an authentication procedure to authenticate the initial first identification information and the first hardware identification information obtained from the user mobile device 44. The management program uses the encoding key stored in second memory 58 to encode the control device identification number, the authenticated initial first identification information and the authenticated first hardware identification number together as first encoded information. The first encoded information has no expiration date (time-unlimited access authority). If it is desired to set an expiration date (time-limited access authority) for the first encoded information, the encoding key can be used to encode the control device identification number, the authenticated initial first identification information, the authenticated first hardware identification number, an access permission start time, and an access permission end time together as the first encoded information, and the first encoded information is only valid between the access permission start time and the access permission end time. Manager mobile device 54 transmits the first encoded information back to the user mobile device 44 connected with manager mobile device 54 and stores the first encoded information into first memory 48. Thus, the user mobile device 44 connected to manager mobile device 54 is granted with the access authority. The access permission start time and the access permission end time can include the date and time (year, month, date, hour, and minute). Manager mobile device 54 is operated repeatedly to grant authority to each user mobile device 44.

Manager mobile device 54 can grant the access authority to itself. Specifically, after manager mobile device 54 executes the management program for the first time, the management program can be executed to permit use of second input device 62 by the manager to input initial second identification information (such as the firstly inputted facial image of the manager), and manager mobile device 54 executes an authentication procedure to generate authenticated initial second identification information and an authenticated second hardware identification number (based on the initial second identification information and the second hardware identification number). Furthermore, the encoding key is used to encode the authenticated initial second identification information and the authenticated second hardware identification number as second encoded information, and the second encoded information is stored in second memory 58. Thus, manager mobile device 54 is granted with the access authority.

When it is desired to use a user mobile device 44 granted with the access authority to access the door, the access program is firstly executed, and the user mobile device 44 is placed within the communication range of wireless transmission device 42 of controller 32. The user mobile device 44 and controller 32 are connected to each other by first wireless transmission module 50 and wireless transmission device 42. In this case, the access program will request the holder of the user mobile device 44 to use first input device 52 to pick up the facial image of the holder of the user mobile device 44 again. The facial image of the holder of the user mobile device 44 is used to generate an instant first identification information. Then, the user mobile device 44 connected to controller 32 transmits the first encoded information, the instant first identification information, and the instant first hardware identification number to controller 32. Namely, every time each user mobile device 44 is connected to controller 32, each user mobile device 44 will request its holder to input the facial image of its holder, and the access program will automatically pick up the first hardware identification number (i.e., the instant first hardware identification number) of each user mobile device 44 connected to controller 32.

After controller 32 has received the first encoded information, the instant first identification information, and the instant first hardware identification number, the decoding key matched with the encoding key of the user mobile device 44 is used to decode the first encoded information. Thus, controller 32 obtains the authenticated initial first identification information and the authenticated first hardware identification number (time-unlimited access authority) contained in the first encoded information. Alternatively, controller 32 obtains the control device identification number, the authenticated initial first identification information, the authenticated first hardware identification number, the access permission start time, and the access permission end time (time-unlimited access authority) contained in the first encoded information. Next, control module 34 of controller 32 identifies whether the authenticated initial first identification information is identical to the instant first identification information, identifies whether the authenticated first hardware identification number is identical to the instant first hardware identification number, and identifies whether the control device identification number in main memory 38 is identical to the control device identification number in the first encoded information.

In a case that the first encoded information does not include the access permission start time and the access permission end time, after comparison by control module 34, if the authenticated initial first identification information is not identical to the instant first identification information, the authenticated first hardware number is not identical to the instant first hardware identification number, or the control device identification number in main memory 38 is not identical to the control device identification number in the first encoded information, locking mechanism 30 remains in the locking state to prohibit latch 24 from moving from the latching position to the unlatching position. Thus, control device 20 is set to be in the locked state, and the door cannot be opened. On the other hand, if the authenticated initial first identification information is identical to the instant first identification information, the authenticated first hardware identification number is identical to the instant first hardware identification number, and the control device identification number in main memory 38 is identical to the control device identification number in the first encoded information, control module 34 of controller 32 controls locking mechanism 30 to be in the unlocking state permitting latch 24 to move from the latching position to the unlatching position. Thus, control device 20 is set to be in the open state, and first handle 26 or second handle 28 can be pivoted to drive unlatching mechanism 22 to move latch 24 from the latching position to the unlatching position, thereby opening the door.

In another case that the first encoded information includes the access permission start time and the access permission end time, after comparison by control module 34, if the authenticated initial first identification information is not identical to the instant first identification information, the authenticated first hardware identification number is not identical to the instant first hardware identification number, or the control device identification number in main memory 38 is not identical to the control device identification number in the first encoded information, locking mechanism 30 remains in the locking state to prohibit latch 24 from moving from the latching position to the unlatching position. Thus, control device 20 is set to be in the locked state, and the door cannot be opened.

In the case that the first encoded information includes the access permission start time and the access permission end time, after comparison by control module 34, if the authenticated initial first identification number is identical to the instant first identification information, the authenticated first hardware identification number is identical to the instant first hardware identification number, and the control device identification number in main memory 38 is identical to the control device identification number in the first encoded information, but the connection time between controller 32 and the user mobile device 44 is not between the access permission start time and the access permission end time, locking mechanism 30 remains in the locking state to prohibit latch 24 from moving from the latching position to the unlatching position. Thus, control device 20 is set to be in the locked state, and the door cannot be opened.

In the case that the first encoded information includes the access permission start time and the access permission end time, after comparison by control module 34, if the authenticated initial first identification number information is identical to the instant first identification information, the authenticated first hardware identification number is identical to the instant first hardware identification number, the control device identification number in main memory 38 is identical to the control device identification number in the first encoded information, and the connection time between controller 32 and the user mobile device 44 is between the access permission start time and the access permission end time, control module 34 of controller 32 controls locking mechanism 30 to be in the unlocking state permitting latch 24 to move from the latching position to the unlatching position. Thus, control device 20 is set to be in the open state, and first handle 26 or second handle 28 can be pivoted to drive unlatching mechanism 22 to move latch 24 from the latching position to the unlatching position, thereby opening the door.

If it is desired to use manager mobile device 54 to open the door, the management program is firstly executed, and manager mobile device 54 executing the management program is placed within the communication range of wireless transmission device 42 of controller 32. Manager mobile device 54 and controller 32 are connected by second wireless transmission module 60 and wireless transmission device 42. In this case, the management program requests the holder of manager mobile device 54 to reuse second input device 62 to pick up the facial image of the holder of manager mobile device 54 for generating an instant second identification information. Then, manager mobile device 54 connected to controller 32 transmits the second encoded information, the instant second identification information, and an instant second hardware identification number to controller 32. Namely, every time manager mobile device 54 is connected to controller 32, manager mobile device 54 will request the holder to input the facial image of the holder of manager mobile device 54 connected to controller 32, and the management program will automatically pick up the second hardware identification number (i.e., the instant second hardware identification number) of manager mobile device 54 connected to controller 32.

After controller 32 has received the second encoded information, the instant second identification information, and the instant second hardware identification number, the decoding key is used to decode the second encoded information. Thus, controller 32 obtains the control device identification number, the authenticated initial second identification information and the authenticated second hardware identification number contained in the second encoded information. Next, control module 34 of controller 32 identifies whether the authenticated initial second identification information is identical to the instant second identification information, identifies whether the authenticated second hardware number is identical to the instant second hardware identification number, and identifies whether the control device identification number in main memory 38 is identical to the control device identification number in the first encoded information.

After comparison by control module 34, if the authenticated initial second identification information is not identical to the instant second identification information, the authenticated second hardware identification number is not identical to the instant second hardware identification number, or the control device identification number in main memory 38 is identical to the control device identification number in the first encoded information, locking mechanism 30 remains in the locking state to prohibit latch 24 from moving from the latching position to the unlatching position. Thus, control device 20 is set to be in the locked state, and the door cannot be opened.

On the other hand, after comparison by control module 34, if the authenticated initial second identification information is identical to the instant second identification information, the authenticated second hardware identification number is identical to the instant second hardware identification number, and the control device identification number in main memory 38 is identical to the control device identification number in the first encoded information, control module 34 of controller 32 controls locking mechanism 30 to be in the unlocking state permitting latch 24 to move from the latching position to the unlatching position. Thus, control device 20 is set to be in the open state, and first handle 26 or second handle 28 can be pivoted to drive unlatching mechanism 22 to move latch 24 from the latching position to the unlatching position, thereby opening the door.

Note that every time a user mobile device 44 is connected to controller 32, if the holder of the user mobile device 44 does not input the instant first identification information, the first encoded information will not be transmitted to controller 32. Likewise, every time manager mobile device 54 is connected to controller 32, if the holder of manager mobile device 54 does not input the instant second identification information, the second encoded information will not be transmitted to controller 32.

Any user mobile device 44 with granted access authority could be lost and be found by a person other than the original holder. If the person finding the user mobile device 44 uses the user mobile device 44 to execute the access program with an intention to open control device 20, the access program requests the person to use first input device 52 to input the instant first identification information, and the first encoded information, the instant first identification information, and the instant first hardware identification number are transmitted to controller 32. Control module 34 uses the decoding key to decode the first encoded information. Then, control module 34 can find that the authenticated initial first identification information is different from the instant first identification information. Thus, even though the authenticated first hardware number is identical to the instant first hardware identification number, locking mechanism 30 still remains in the locking state to prohibit latch 24 from moving from the latching position to the unlatching position. Thus, control device 20 remains in the locked state, and the door cannot be opened. Likewise, if manager mobile device 54 is lost, the authenticated initial second identification information would be different from the instant second identification information to keep control device 20 in the locked state, avoiding opening of the door.

If an unauthorized person steals the first encoded information that is being transmitted in a state in which a user mobile device 44 is connected to controller 32, the unauthorized person cannot know the content of the first encoded information without the corresponding decoding key. Furthermore, even if the unauthorized person saves the first encoded information in his mobile device and installs the access program to make his mobile device become a user mobile device 44, every time the unauthorized person uses the user mobile device 44 to connect with controller 32, the access program requests the unauthorized person to use the first input device 52 to input the instant first identification information, and the instant first identification information will be transmitted to controller 32 together with the instant first hardware identification number of the user mobile device 44 being used by the unauthorized person. Thus, the instant first identification information inputted by the unauthorized person will be identified to be different from the authenticated first identification information, and the authenticated first hardware identification number will be identified to be different from the instant first hardware identification number. Thus, control device 20 remains in the locked state, and the door cannot be opened. Likewise, if the second encoded information of manager mobile device 54 is stolen, the authenticated initial second identification information will be identified to be different from the instant second identification information, and the authenticated second hardware identification number will be identified to be different from the instant hardware identification number. Thus, control device 20 remains in the locked state, and the door cannot be opened.

Since the control device identification number of controller 32 corresponding to control device 20 is also encoded into the first encoded information during the access authority granting procedure of control system 10, the control device identification number can be used to control access authority of each user mobile device 44. For example, a plurality of controllers 32 and a plurality of control devices 20 (such as door locks) electrically connected to controllers 32 can be used in a building. Main memories 38 of controllers 32 store independent and different control device identification numbers respectively corresponding to control devices 20 (see FIG. 2). During the authority granting procedure of any one of user mobile devices 44, manager mobile device 54 can selectively grant the user mobile device 44 with the access authority of at least one of control devices 20. Namely, when manager mobile device 54 encodes the first encoded information, at least one control device identification number can be selectively sent to the user mobile device 44. For example, if the first encoded information obtained by the user mobile device 44 includes only one control device identification number corresponding to one of control devices 20, the user mobile device 44 is granted with access authority to open the one of control devices 20 and is not granted with access authority to open the other control devices 20. If the first encoded information obtained by the user mobile device 44 includes the control device identification numbers corresponding to all control devices 20, the user mobile device 44 is granted with access authority to open all control devices 20.

After granting access authority to each user mobile device 44, the access authority of certain user mobile devices 44 can be cancelled. Specifically, after manager mobile device 54 has granted access authority to each user mobile device 44, an access list is established in manager mobile device 54 by the management program, and information related to access authority of each user mobile device 44 is stored. Thus, when it is desired to cancel the access authority of at least one of user mobile devices 44, manager mobile device 54 executes the management program and is connected to controller 32. Then, an interface of the management program of manager mobile device 54 is used to select at least one user mobile device 44 and send the information of the selected at least one user mobile device 44 to main memory 38 of controller 32 to establish a black list. Specifically, the first hardware identification number of the selected at least one user mobile device 44 can be sent to and stored in memory 38 of controller 32 to establish the black list.

In a case that controller 32 includes a black list, when each user mobile device 44 is performing the access authority, controller 32 firstly identifies whether the instant hardware identification number (which is sent to controller 32 together with the instant first identification number and the first encoded information) is in the black list. If the instant hardware identification number is not in the black list, the first encoded information is decoded. On the other hand, if the instant hardware identification number is in the black list, controller 32 does not permit decoding of the first encoded information by the decoding key, locking mechanism 30 remains in the locking state to prohibit latch 24 from moving from the latching position to the unlatching position.

Figure 2:
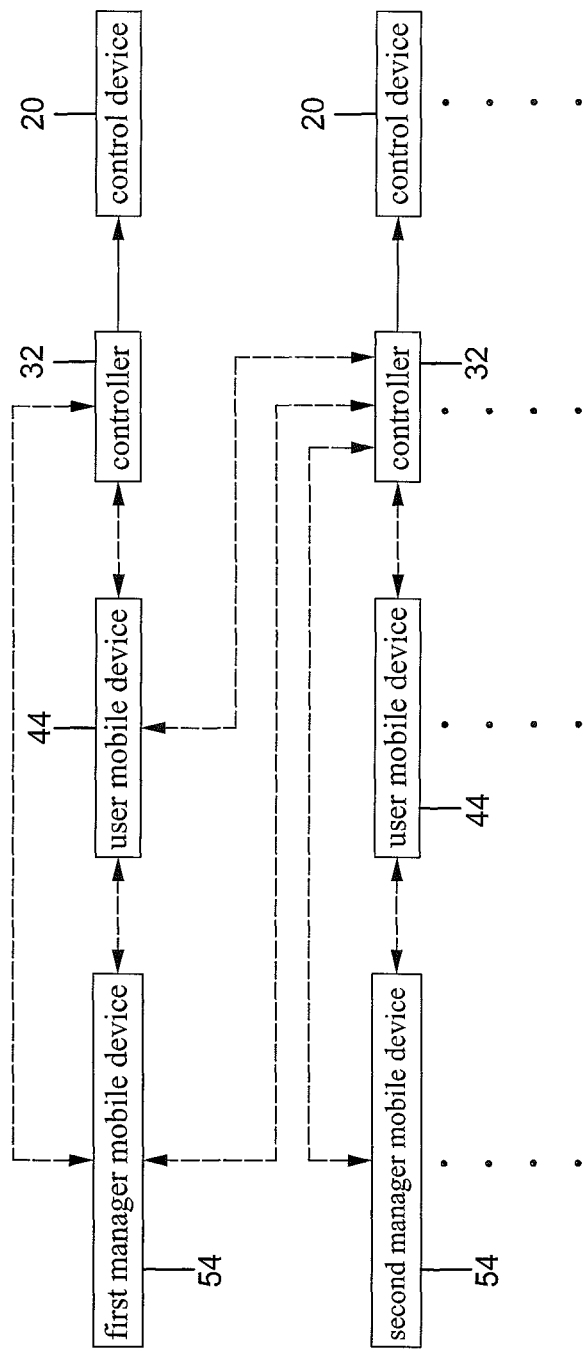
FIG. 2 is a diagrammatic block diagram of another example of the control system according to the present invention.

Furthermore, since the control device identification numbers of control devices 20 are required when manager mobile device 54 is obtaining the management authority, a plurality of manager mobile devices 54 can be used (see FIG. 2). For example, a plurality of controllers 32 and a plurality of control devices 20 (such as door locks) electrically connected to controllers 32 can be used in a building. A first one of manager mobile devices 54 can be connected to all controllers 32 to obtain all control device identification numbers and the management authority of all control devices 20. A second one of manager mobile devices 54 can be connected to at least one of controllers 32 to obtain at least one of control device identification numbers and the management authority of at least one of control devices 20 connected to the at least one of controllers 32. Thus, the first manager mobile device 54 can selectively grant a user mobile device 44 with the access authority of all or a desired number of control devices 20. The second manager mobile device 54 can grant the user mobile device 44 with the access authority of the at least one control device 20.

Control system 10 uses the authenticated initial first identification information and the instant first identification information that must be inputted every time the user mobile device 44 is connected to controller 32 to avoid control device 20 from being switched to the open state even if the user mobile device 44 is lost or the signal is picked up by an unauthorized person, providing an excellent door access control effect.

Furthermore, control system 10 uses the authenticated initial second identification information and the instant second identification information that must be inputted every time manager mobile device 54 is connected to controller 32 to avoid control device 20 from being switched to the open state even if manager mobile device 54 is lost or the signal is picked up by an unauthorized person.

Manager mobile device 54 and each user mobile device 44 are connected via the Internet, a mobile communication network, or a local area network, such that manager mobile device 54 can remotely grant the access authority to each user mobile device 44, effectively increasing the management efficiency of control system 10.

Furthermore, since each user mobile device 44 will request the holder of the user mobile device 44 to use the first input device 52 to input the instant first identification information every time the user mobile device 44 is connected to controller 32 and since manager mobile device 54 will request the holder of manager mobile device 54 to use the second input device 62 to input the instant second identification information every time manager mobile device 54 is connected to controller 32, in a case that each of the first input device 52 and the second input device 62 is an image pick-up device, a fingerprint input device, a finger vein recognition device, or an iris recognition device, if any user mobile device 44 or manager mobile device 54 is lost, and the person finding the user mobile device 44 or manager mobile device 54 tries to open control device 20, the instant first identification information or the instant second identification information can be used to find out the person finding the user mobile device 44 or manager mobile device 54.

Furthermore, since each user mobile device 44 will request the holder of the user mobile device 44 to use the first input device 52 to input the instant first identification information every time the user mobile device 44 is connected to controller 32 and since manager mobile device 54 will request the holder of manager mobile device 54 to use the second input device 62 to input the instant second identification information every time manager mobile device 54 is connected to controller 32, in a case that each of the first input device 52 and the second input device 62 is an image pick-up device, a fingerprint input device, a finger vein recognition device, or an iris recognition device, if an unauthorized person intends to open control device 20 with the first or second encoded information, the instant first identification information or the instant second identification information transmitted to controller 32 can be used to find out the unauthorized person. Furthermore, the instant first hardware identification number or the instant second hardware identification number transmitted to controller 32 can be used to find out the unauthorized person. Furthermore, every time the user mobile device 44 or manager mobile device 54 is connected to controller 32, input of the instant first identification information or the instant second identification information will be requested to identify the identity of the user or the holder intending to connect with controller 32 (such as by using the facial image of the user or the holder). Furthermore, only the user or the holder (granted with the access authority) can use his own user mobile device 44 or the mobile device of the manager to switch control device 20 to the open state.

It can be appreciated that first handle 26 and second handle 28 can be of any desired form as conventional including but not limited to of a commercially available type, as long as they can be used to control movement of latch 24.

Control system 10 stores independent control device identification numbers in main memories 38 of controllers 32 through each control device 20 to selectively grant access authority of one or more control devices 20, which is convenient to management of plural control devices 20.

Furthermore, since the control device identification numbers are required while obtaining the access authority through control devices 20, plural manager mobile devices 54 can be used to manage different or similar control devices 20, distinctly separate manager mobile devices 54 of different management authority, which is simpler and more flexible to management of control system 10.

Furthermore, control system 10 permits establishment of a black list in main memory 38 of each controller 32 to cancel the access authority of the user mobile devices 44 that had been granted with access authority. Thus, even if the manager is not connected to the user mobile devices 44, the access authority of the user mobile devices 44 can be cancelled, which is convenient to the manager.

Thus since the illustrative embodiments disclosed herein may be embodied in other specific forms without departing from the spirit or general characteristics thereof, some of which forms have been indicated, the embodiments described herein are to be considered in all respects illustrative and not restrictive. The scope is to be indicated by the appended claims, rather than by the foregoing description, and all changes which come within the meaning and range of equivalency of the claims are intended to be embraced therein.

The invention claimed is:

1. A control system comprising:
   a control device controllable to be in an open state or a locked state;
   a controller including a control module electrically connected to the control device, a main memory electrically connected to the control module, and a wireless transmission device electrically connected to the control module, a reset device electrically connected to the control module, with the reset device operable to reset the control module to a reset state, with the control module controlling the control device to be in the open state or the locked state, and with a decoding key and a control device identification number corresponding to the control device stored in the main memory;

a plurality of user mobile devices, with an access program installed in each of the plurality of user mobile devices, with each of the plurality of user mobile devices including a first processor, a first memory electrically connected to the first processor, and a first wireless transmission module electrically connected to the first processor, with each of the plurality of user mobile devices further including a first input device, and with the first input device configured for electrical connection with the wireless transmission device; and a manager mobile device, with a management program installed in the manager mobile device, with the manager mobile device including a second processor, a second memory electrically connected to the second processor, and a second wireless transmission module electrically connected to the second processor, with an encoding key stored in the second memory and corresponding to the decoding key, with the second wireless transmission module configured to permit connection with the wireless transmission device and configured to permit connection with each of the first wireless transmission modules;

with each of the plurality of user mobile devices executing the access program for a first time, each of the plurality of user mobile devices requests a holder thereof to use the first input device thereof to input initial first identification information and permits the first wireless transmission module thereof to be connected to the wireless transmission device, wherein when the first wireless transmission module of one of the plurality of user mobile devices executing the access program is within a communication range of the wireless transmission device, the first wireless transmission module of the one of the plurality of user mobile devices is connected to the wireless transmission device, wherein when the first wireless transmission module of one of the plurality of user mobile devices executing the access program is outside of the communication range of the wireless transmission device, the first wireless transmission module of the one of the plurality of user mobile devices is not connected to the wireless transmission device, wherein when the manager mobile device is executing the management program and is within the communication range of the wireless transmission device, the second wireless transmission module is connected to the wireless transmission device, wherein when the manager mobile device is executing the management program and is outside of communication range of the wireless transmission device, the second wireless transmission module is not connected to the wireless transmission device, with the manager mobile device executing the access program, and with one of the plurality of user mobile devices executing the access program and located outside of a communication range of the second wireless transmission module, the first wireless transmission module of the one of the plurality of user mobile devices is not connected to the second wireless transmission module, with the control module in the reset state and with the second wireless transmission module of the manager mobile device in connection with the wireless transmission device, the manager mobile device is permitted to obtain the control device identification number in the main memory and to store the control device identification number in the second memory, and the manager mobile device obtains management authority, with the control module not in the reset state and with the second wireless transmission module of the manager mobile device in connection with the wireless transmission device, the manager mobile device is not permitted to obtain the control device identification number in the main memory and is not permitted to store the control device identification number in the second memory, with the first wireless transmission module of one of the plurality of user mobile devices connected to the second wireless transmission module, the manager mobile device is permitted to obtain the initial first identification information of the connected user mobile device and executes an authentication procedure to generate an authenticated initial first identification information, and the encoding key stored in the second memory is used to encode the authenticated initial first identification information and the control device identification number as first encoded information, and the first encoded information is sent back to the connected user mobile device and is stored in the first memory of the connected user mobile device, with the first wireless transmission module of each of the plurality of user mobile devices not in connection with the second wireless transmission module, the manager mobile device is not permitted to obtain the initial first identification information of each of the plurality of user mobile devices, with every time the first wireless transmission module of one of the plurality of user mobile devices in connection with the wireless transmission device, the access program of the connected user mobile device requests the holder of the connected user mobile device to use the first input device to input an instant first identification information, and the control module obtains the first encoded information and the instant first identification information of the connected user mobile device, with none of the first wireless transmission modules of the plurality of user mobile devices in connection with the wireless transmission device, the control module is not permitted to obtain the first encoded information and the instant first identification information of each of the plurality of user mobile devices, wherein the control module is permitted to use the decoding key to decode the first encoded information, obtaining the authenticated initial first identification information contained in the first encoded information, wherein when the control module identifies that the authenticated initial first identification information of the connected user mobile device is identical to the instant first identification information and identifies that the control device identification number in the first encoded information is identical to the control device identification number in the main memory, the control module sets the control device to be in the open state, and wherein when the control module identifies that the authenticated initial first identification information of the connected user mobile device is not identical to the instant first identification information or identifies that the control device identification number in the first encoded information is not identical to the control device identification number in the main memory, the control module sets the control device to be in the locked state.

2. The control system as claimed in claim 1, with the controller further including a time module electrically connected to the control module, with the time module providing a date and a time,
- with the control module in the reset state and with the second wireless transmission module of the manager mobile device in connection with the wireless transmission device, the manager mobile device and the time module are synchronized such that the time and the date of the time module are consistent with a time and a date of the manager mobile device,
- wherein the manager mobile device uses the encoding key to encode the authenticated initial first identification information, the control device identification number, an access permission start time, and an access permission end time as the first encoded information,
- wherein after the control module has obtained the first encoded information of the connected user mobile device and the instant first identification information, the decoding key is used to decode the first encoded information to obtain the authenticated initial first identification information, the control device identification number, the access permission start time, and the access permission end time contained in the first encoded information,
- wherein when the control module identifies that the authenticated initial first identification information of the connected user mobile device is identical to the instant first identification information, identifies that the time of the time module is between the access permission start time and the access permission end time, and identifies that the control device identification number in the first encoded information is identical to the control device identification number in the main memory, the control module sets the control device to be in the open state, and
- wherein when the control module identifies that the authenticated initial first identification information of the connected user mobile device is not identical to the instant first identification information, identifies that the time of the time module is not between the access permission start time and the access permission end time, or identifies that the control device identification number in the first encoded information is not identical to the control device identification number in the main memory, the control module sets the control device to be in the locked state.

3. The control system as claimed in claim 1, with each of the plurality of user mobile devices having a first hardware identification number, with the first hardware identification numbers of the plurality of user mobile devices different from each other,
- with the first wireless transmission module of one of the plurality of user mobile devices in connection with the second wireless transmission module, the manager mobile device is permitted to obtain the first hardware identification number and the initial first identification information of the connected user mobile device, the manager mobile device executes the authentication procedure to generate an authenticated first hardware identification number and authenticated initial first identification information, and the encoding key is used to encode the authenticated first hardware identification number, the control device identification number, and the authenticated initial first identification information as the first encoded information,
- wherein every time one of the user mobile devices executes the access program and is in connection with the wireless transmission device and the first wireless transmission module, the access program obtains the instant first hardware identification number of the connected user mobile device,
- with none of the first wireless transmission modules of the plurality of user mobile devices in connection with the second wireless transmission module, the manager mobile device is not permitted to obtain the initial first identification information and the first hardware identification number of each of the plurality of user mobile devices,
- with the first wireless transmission module of one of the plurality of user mobile devices in connection with the wireless transmission device, the control module is permitted to obtain an instant first hardware identification number of the connected user mobile device,
- with none of the first wireless transmission modules of the plurality of user mobile devices in connection with the wireless transmission device, the control module is not permitted to obtain the instant first hardware identification number of each of the plurality of user mobile devices,
- wherein when the control module identifies that the authenticated initial first identification information of the connected user mobile device is identical to the instant first identification information, identifies that the authenticated first hardware identification number of the connected user mobile device is identical to the instant first hardware identification number, and identifies that the control device identification number in the first encoded information is identical to the control device identification number in the main memory, the control module sets the control device to be in the open state, and
- wherein when the control module identifies that the authenticated initial first identification information of the connected user mobile device is not identical to the instant first identification information, identifies that the authenticated first hardware identification number of the connected user mobile device is not identical to the instant first hardware identification number, or identifies that the control device identification number in the first encoded information is not identical to the control device identification number in the main memory, the control module sets the control device to be in the locked state.

4. The control system as claimed in claim 3, wherein when the second wireless transmission module of the manager mobile device is in connection with the wireless transmission device, the manager mobile device is permitted to send the first hardware identification number of selected at least one of the plurality of user mobile devices to the main memory and is permitted to store the first hardware identification number of the selected at least one of the plurality of user mobile devices in the main memory to establish a black list,
- wherein when the control module obtains the first encoded information and the instant first hardware identification number of one of the selected at least one of the plurality of user mobile devices, the control module identifies whether the instant first hardware identification number is in the black list, wherein when the instant first hardware identification number of the one of the selected at least one of the plurality of user mobile devices is in the black list, the control module does not use the decoding key to decode the first encoded information of the one of the plurality of user mobile devices, and the control device is in the locked state, and wherein when instant first hardware identification number of the one of the selected at least one of the plurality of user mobile devices is not in the black list, the control module uses the decoding key to decode the first encoded information.

5. The control system as claimed in claim 1, with the manager mobile device including a second hardware identification number, with the manager mobile device further including a second input device electrically connected to the second processor, with the manager mobile device executing the management program for a first time, a manager using the manager mobile device is requested to use the second input device to input an initial second hardware identification number, the manager mobile device executes an authentication procedure to generate authenticated initial second identification information and an authenticated second hardware identification number, and the encoding key is used to encode the authenticated initial second identification information, the control device identification number, and the authenticated second hardware identification number as second encoded information, wherein every time the second wireless transmission module of the manager mobile device is connected to the wireless transmission device of the controller, the management program of the manager mobile device requests a holder of the manager mobile device to use the second input device to input an instant second identification information and picks up an instant second hardware identification number of the connected manager mobile device, and the control module is permitted to obtain the second encoded information, the instant second hardware identification number, and the instant second identification information, wherein after the control module has obtained the second encoded information, the second hardware identification number, and the second identification information of the manager mobile device, the decoding key is used to decode the second encoded information to obtain the authenticated second hardware identification number, the control device identification number, and the authenticated initial second identification information contained in the second encoded information, wherein when the control module identifies that the authenticated second hardware identification number of the manager mobile device is identical to the instant second hardware identification number, identifies that the authenticated initial second identification information is identical to the instant second identification information of the manager mobile device, and identifies that the control device identification number in the first encoded information is identical to the control device identification number in the main memory, the control module sets the control device to be in the open state, and wherein when the control module identifies that the authenticated second hardware identification number of the manager mobile device is not identical to the instant second hardware identification number, identifies that the authenticated initial second identification information is not identical to the instant second identification information of the manager mobile device, or identifies that the control device identification number in the first encoded information is not identical to the control device identification number in the main memory, the control module sets the control device to be in the locked state.

6. The control system as claimed in claim 5, wherein each first input device is an image pick-up device, the holder of a respective one of the plurality of user mobile devices is requested to use the first input device to pick up a facial image of the holder of the respective one of the plurality of user mobile devices, and characteristics of the facial image of the holder of the respective one of the plurality of user mobile devices are encoded to be used as the initial first identification information or the instant first identification information, and wherein the second input device is an image pick-up device, the holder of the manager mobile device is requested to use the second input device to pick up a facial image of the holder of the manager mobile device, and characteristics of the facial image of the holder of the manager mobile device are encoded to be used as the initial second identification information or the instant second identification information.

7. The control system as claimed in claim 5, wherein each first input device is a microphone, the holder of a respective one of the plurality of user mobile devices is requested to use the first input device to pick up a voice of the holder of the respective one of the plurality of user mobile devices, and the voice of the holder of the respective one of the plurality of user mobile devices is edited as a vocal print which is used as the initial first identification information or the instant first identification information, and wherein the second input device is a microphone, the holder of the manager mobile device is requested to use the second input device to pick up a voice of the holder of the manager mobile device, and the voice of the holder of the manager mobile device is edited as a vocal print which is used as the initial second identification information or the instant second identification information.

8. The control system as claimed in claim 5, wherein each first input device is a fingerprint input device, the holder of a respective one of the plurality of user mobile devices is requested to use the first input device to pick up a fingerprint of the holder of the respective one of the plurality of user mobile devices, and characteristics of the fingerprint are encoded to be used as the initial first identification information or the instant first identification information, and the second input device is a fingerprint input device, the holder of the manager mobile device is requested to use the second input device to pick up a fingerprint of the holder of the manager mobile device, and characteristics of the fingerprint are encoded to be used as the initial second identification information or the instant second identification information.

9. The control system as claimed in claim 5, each first input device is a finger vein recognition device, the holder of a respective one of the plurality of user mobile devices is requested to use the first input device to pick up a finger vein image of the holder of the respective one of the plurality of user mobile devices, and characteristics of the finger vein image of the holder of the respective one of the plurality of user mobile devices are encoded to be used as the initial first identification information or the instant first identification information, and the second input device is a finger vein recognition device, the holder of the manager mobile device is requested to use the second input device to pick up a finger vein image of the holder of the manager mobile device, and characteristics of the finger vein image of the holder of the manager mobile device are encoded to be used as the initial second identification information or the instant second identification information.

10. The control system as claimed in claim 5, wherein each first input device is an iris recognition device, the holder of a respective one of the plurality of user mobile devices is requested to use the first input device to pick up the iris image of the holder of the respective one of the plurality of user mobile devices, and characteristics of the iris image of the holder of the respective one of the plurality of user mobile devices are encoded to be used as the initial first identification information or the instant first identification information, and wherein the second input device is an iris recognition device, the holder of the manager mobile device is requested to use the second input device to pick up the iris image of the holder of the manager mobile device, and characteristics of the iris image of the holder of the manager mobile device are encoded to be used as the initial second identification information or the instant second identification information.

11. The control system as claimed in claim 5, wherein each first input device includes a touch screen, the holder of the user mobile device is requested to use the touch screen of the first input device to input a pin number or a specific figure of the holder of the user mobile device, and the pin number or the specific figure of the holder of the user mobile device is used as the initial first identification information or the instant first identification information, wherein the second input device is a touch screen, the holder of the manager mobile device is requested to use the touch screen of the second input device to input a pin number or a specific figure of the holder of the manager mobile device, and the pin number or the specific figure of the holder of the manager mobile device is used as the initial second identification information or the instant second identification information.

12. A control system comprising:

a plurality of control devices each controllable to be in an open state or a locked state;

a plurality of controllers, with each of the plurality of controllers including a control module electrically connected to one of the plurality of control devices, a main memory electrically connected to the control module, a wireless transmission device electrically connected to the control module, and a reset device electrically connected to the control module and operable to reset the control module to a reset state, with each control module controlling one of the plurality of control devices to be in the open state or the locked state, and with a decoding key and a control device identification number corresponding to one of the plurality of control devices stored in the main memory of a corresponding one of the plurality of controllers;

a plurality of user mobile devices, with an access program installed in each of the plurality of user mobile devices, with each of the plurality of user mobile devices including a first processor, a first memory electrically connected to the first processor, and a first wireless transmission module electrically connected to the first processor, with each of the plurality of user mobile devices further including a first input device, and with the first input device configured for electrical connection with the wireless transmission device; and a manager mobile device, with a management program installed in the manager mobile device, with the manager mobile device including a second processor, a second memory electrically connected to the second processor, and a second wireless transmission module electrically connected to the second processor, with an encoding key stored in the second memory and corresponding to the decoding key, with the second wireless transmission module configured to permit connection with each wireless transmission device and configured to permit connection with each first wireless transmission module;

with each of the plurality of user mobile devices executing the access program for a first time, each of the plurality of user mobile devices requests a holder thereof to use the first input device thereof to input an initial first identification information and permits the first wireless transmission module thereof to be connected to the wireless transmission device of a corresponding one of the plurality of controllers, wherein when the first wireless transmission module of at least one of the plurality of user mobile devices executing the access program is within a communication range of the wireless transmission device of one of the plurality of controllers, the first wireless transmission module of the at least one of the plurality of user mobile devices is connected to the wireless transmission device of the one of the plurality of controller, wherein when the first wireless transmission module of one of the plurality of user mobile devices executing the access program is outside of the communication ranges of the wireless transmission devices of all of the plurality of controllers, the first wireless transmission module is not connected to the wireless transmission device of the one of the plurality of controllers, wherein when the manager mobile device is executing the management program and is within the communication range of the wireless transmission device of at least one of the plurality of controllers, the second wireless transmission module is connected to the wireless transmission device of the at least one of the plurality of controllers, wherein when the manager mobile device is executing the management program and is outside of communication ranges of the wireless transmission devices of all of the plurality of controllers, the second wireless transmission module is not connected to the wireless transmission devices of the plurality of controllers, with the manager mobile device executing the access program, and with one of the plurality of user mobile devices executing the access program and located outside of a communication range of the second wireless transmission module, the first wireless transmission module of the one of the plurality of user mobile devices is not connected to the second wireless transmission module, with the second wireless transmission module of the manager mobile device in connection with the wireless transmission device of one of the plurality of controllers whose control module is in the reset state, the manager mobile device is permitted to obtain the control device identification number in the main memory of the connected controller and to store the control device identification number in the second memory, and the manager mobile device obtains management authority over the connected controller, with the second wireless transmission module of the manager mobile device in connection with the wireless transmission device of one of the plurality of controllers whose control module is not in the reset state, the manager mobile device is not permitted to obtain the control device identification number in the main memory of the connected controller and is not permitted to store the control device identification number in the second memory, with the first wireless transmission module of one of the plurality of user mobile devices connected to the second wireless transmission module, the manager mobile device is permitted to obtain the initial first identification information of the connected user mobile device and executes an authentication procedure to generate authenticated initial first identification information, and the encoding key stored in the second memory is used to encode the authenticated initial first identification information and the control device identification number as first encoded information, and the first encoded information is sent back to the connected user mobile device and is stored in the first memory of the connected user mobile device, with the first wireless transmission module of each of the plurality of user mobile devices not in connection with the second wireless transmission module, the manager mobile device is not permitted to obtain the initial first identification information of each of the plurality of user mobile devices, with every time the first wireless transmission module of one of the plurality of user mobile devices in connection with the wireless transmission device of one of the plurality of controllers, the access program of the connected user mobile device requests the holder of the connected user mobile device to use the first input device to input instant first identification information, and the control module of the connected controller obtains the first encoded information and the instant first identification information of the connected user mobile device, with none of the first wireless transmission modules of the plurality of user mobile devices in connection with the wireless transmission device of the plurality of controllers, the control module of each of the plurality of controllers is not permitted to obtain the first encoded information and the instant first identification information of each of the plurality of user mobile devices, wherein the control module of each of the connected controllers is permitted to use the decoding key to decode the first encoded information, obtaining the authenticated initial first identification information contained in the first encoded information, wherein when the control module of each of the connected controllers identifies that the authenticated initial first identification information of the connected user mobile device is identical to the instant first identification information and identifies that the control device identification number in the first encoded information is identical to the control device identification number in the main memory, the control module of each of the connected controllers sets the correspondingly connected control device to be in the open state, and wherein when the control module of each of the connected controllers identifies that the authenticated initial first identification information of the connected user mobile device is not identical to the instant first identification information or identifies that the control device identification number in the first encoded information is not identical to the control device identification number in the main memory, the control module of each of the connected controllers sets the correspondingly connected control device to be in the locked state.

13. The control system as claimed in claim 12, with each of the plurality of controllers further including a time module electrically connected to the control module, with the time module providing a date and a time, with the second wireless transmission module of the manager mobile device in connection with the wireless transmission device of one of the plurality of controllers whose control module is in the reset state, the manager mobile device and the time module of the connected controller are synchronized such that the time and the date of the time module of the connected controller in the rest state are consistent with a time and a date of the manager mobile device, wherein the manager mobile device uses the encoding key to encode the authenticated initial first identification information, the control device identification number, an access permission start time, and an access permission end time as the first encoded information, wherein after the control module of one of the plurality of controllers has obtained the first encoded information of the connected user mobile device and the instant first identification information, the decoding key is used to decode the first encoded information to obtain the authenticated initial first identification information, the control device identification number, the access permission start time, and the access permission end time contained in the first encoded information, wherein when the control module of the one of the plurality of controllers identifies that the authenticated initial first identification information of the connected user mobile device is identical to the instant first identification information, identifies that the time of the time module is between the access permission start time and the access permission end time, and identifies that the control device identification number in the first encoded information is identical to the control device identification number in the main memory, the control module of the one of the plurality of controllers sets the correspondingly connected control device to be in the open state, and wherein when the control module of the one of the plurality of controllers identifies that the authenticated initial first identification information of the connected user mobile device is not identical to the instant first identification information, identifies that the time of the time module is not between the access permission start time and the access permission end time, or identifies that the control device identification number in the first encoded information is not identical to the control device identification number in the main memory, the control module of the one of the plurality of controllers sets the correspondingly connected control device to be in the locked state.

14. The control system as claimed in claim 12, with each of the plurality of user mobile devices having a first hardware identification number, with the first hardware identification numbers of the plurality of user mobile devices different from each other, with the first wireless transmission module of one of the plurality of user mobile devices in connection with the second wireless transmission module, the manager mobile device is permitted to obtain the first hardware identification number and the initial first identification information of the connected user mobile device, the manager mobile device executes the authentication procedure to generate an authenticated first hardware identification number and authenticated initial first identification information, and the encoding key is used to encode the authenticated first hardware identification number, the control device identification number, and the authenticated initial first identification information as the first encoded information, wherein every time one of the user mobile devices executes the access program and is in connection with the wireless transmission device of one of the plurality of controllers and the first wireless transmission module, the access program of the connected user mobile obtains the instant first hardware identification number of the connected user mobile device, with none of the first wireless transmission modules of the plurality of user mobile devices in connection with the second wireless transmission module, the manager mobile device is not permitted to obtain the initial first identification information and the first hardware identification number of each of the plurality of user mobile devices, with the first wireless transmission module of one of the plurality of user mobile devices in connection with the wireless transmission device of one of the plurality of controllers, the control module of the connected controller is permitted to obtain an instant first hardware identification number of the connected user mobile device, with none of the first wireless transmission modules of the plurality of user mobile devices in connection with the wireless transmission device of the plurality of controllers, the control module of each of the plurality of controllers is not permitted to obtain the instant first hardware identification number of each of the plurality of user mobile devices, wherein when the control module of one of the plurality of controllers identifies that the authenticated initial first identification information of the connected user mobile device is identical to the instant first identification information, identifies that the authenticated first hardware identification number of the connected user mobile device is identical to the instant first hardware identification number, and identifies that the control device identification number in the first encoded information is identical to the control device identification number in the main memory, the control module of the one of the plurality of controllers sets the correspondingly connected control device to be in the open state, and wherein when the control module of the one of the plurality of controllers identifies that the authenticated initial first identification information of the connected user mobile device is not identical to the instant first identification information, identifies that the authenticated first hardware identification number of the connected user mobile device is not identical to the instant first hardware identification number, or identifies that the control device identification number in the first encoded information is not identical to the control device identification number in the main memory, the control module of the one of the plurality of controllers sets the correspondingly connected control device to be in the locked state.

15. The control system as claimed in claim 14, wherein when the second wireless transmission module of the manager mobile device is in connection with the wireless transmission device of one of the plurality of controllers that has been granted management authority, the manager mobile device is permitted to send the first hardware identification number of selected at least one of the plurality of user mobile devices to the main memory and is permitted to store the first hardware identification number of the selected at least one of the plurality of user mobile devices in the main memory of the controller that has been granted management authority, establishing a black list, wherein when the second wireless transmission module of the manager mobile device is connected to the wireless transmission device of one of the plurality of controllers that has not been granted with management authority, the manager mobile device is not permitted to establish the black list, wherein when the control module of one of the plurality of controllers obtains the first encoded information and the instant first hardware identification number of any one of the plurality of user mobile devices, the control module of the one of the plurality of controllers identifies whether the instant first hardware identification number is in the black list, wherein when the instant first hardware identification number of one of the plurality of user mobile devices is in the black list, the control module of the one of the plurality of controllers does not use the decoding key to decode the first encoded information, and the connected control device is in the locked state, and wherein when instant first hardware identification number of any one of the plurality of user mobile devices is not in the black list, the control module of the one of the plurality of controllers uses the decoding key to decode the first encoded information.

16. A control system comprising:

a plurality of control devices each controllable to be in an open state or a locked state;

a plurality of controllers, with each of the plurality of controllers including a control module electrically connected to one of the plurality of control devices, a main memory electrically connected to the control module, a wireless transmission device electrically connected to the control module, and a reset device electrically connected to the control module and operable to reset the control module to a reset state, with each control module controlling one of the plurality of control devices to be in the open state or the locked state, and with a decoding key and a control device identification number corresponding to one of the plurality of control device stored in the main memory of a corresponding one of the plurality of controllers;

a plurality of user mobile devices, with an access program installed in each of the plurality of user mobile devices, with each of the plurality of user mobile devices including a first processor, a first memory electrically connected to the first processor, and a first wireless transmission module electrically connected to the first processor, with each of the plurality of user mobile devices further including a first input device, and with the first input device configured for electrical connection with the wireless transmission device; and a plurality of manager mobile devices, with a management program installed in each of the plurality of manager mobile devices, with each of the plurality of manager mobile devices including a second processor, a second memory electrically connected to the second processor, and a second wireless transmission module electrically connected to the second processor, with an encoding key stored in the second memory and corresponding to the decoding key, with the second wireless transmission module of each of the plurality of manager mobile devices configured to permit connection with at least one of the wireless transmission devices and configured to permit connection with each first wireless transmission module;

with each of the plurality of user mobile devices executing the access program for a first time, each of the plurality of user mobile devices requests a holder thereof to use the first input device thereof to input an initial first identification information and permits the first wireless transmission module thereof to be connected to the wireless transmission device, wherein when the first wireless transmission module of at least one of the plurality of user mobile devices executing the access program is within a communication range of the wireless transmission device of one of the plurality of controllers, the first wireless transmission module of the at least one of the plurality of user mobile devices is connected to the wireless transmission device of the one of the plurality of controllers, wherein when the first wireless transmission module of one of the plurality of user mobile devices executing the access program is outside of the communication ranges of the wireless transmission devices of the plurality of controllers, the first wireless transmission module of the one of the plurality of user mobile devices is not connected to the wireless transmission devices of the plurality of controllers, wherein when one of the plurality of manager mobile devices is executing the access program and is within the communication range of the wireless transmission device of one of the plurality of controllers, the second wireless transmission module is connected to the wireless transmission device of the one of the plurality of controllers, wherein when one of the plurality of manager mobile devices is executing the management program and is outside of communication range of the wireless transmission devices of all of the plurality of controllers, the second wireless transmission module 60 of the manager mobile device executing the management program is not connected to the wireless transmission devices of all of the plurality of controllers, with one of the plurality of manager mobile devices executing the management program, and with one of the plurality of user mobile devices executing the access program and located outside of a communication range of the second wireless transmission module of one of the plurality of manager mobile devices executing the management program, the first wireless transmission module of the one of the plurality of user mobile devices is not connected to the second wireless transmission module of one of the plurality of manager mobile devices executing the management program, with the second wireless transmission module of one of the plurality of manager mobile devices in connection with the wireless transmission device of one of the plurality of controllers whose control module is in the rest state, the connected manager mobile device is permitted to obtain the control device identification number in the main memory and is permitted to store the control device identification number in the second memory of the connected manager mobile device, the connected manager mobile device obtains manager authority over the connected controller, with the second wireless transmission module of one of the plurality of manager mobile devices in connection with the wireless transmission device of one of the plurality of controllers whose control module not in the reset state, the connected manager mobile device is not permitted to obtain the control device identification number in the main memory of the connected controller and is not permitted to store the control device identification number in the second memory of the connected controller, with the first wireless transmission module of one of the plurality of user mobile devices connected to the second wireless transmission module of at least one of the plurality of user mobile devices, the one of the plurality of manager mobile devices is permitted to obtain the initial first identification information of the connected at least one user mobile device and executes an authentication procedure to generate an authenticated initial first identification information, and the encoding key stored in the second memory is used to encode the authenticated initial first identification information and the control device identification number as first encoded information, and the first encoded information is sent back to the connected user mobile device and is stored in the first memory of the connected user mobile device, with the first wireless transmission module of each of the plurality of user mobile devices not in connection with the second wireless transmission modules of all of the plurality of manager mobile devices, each of the plurality of manager mobile devices is not permitted to obtain the initial first identification information of each of the plurality of user mobile devices, with every time the first wireless transmission module of one of the plurality of user mobile devices in connection with the wireless transmission device of one of the plurality of controllers, the access program of the connected user mobile device requests the holder of the connected user mobile device to use the first input device thereof to input instant first identification information, and the control module of the connected controller obtains the first encoded information and the instant first identification information of the connected user mobile device, with the first wireless transmission module of one of the plurality of user mobile devices not in connection with the wireless transmission device of any one of the plurality of controllers, the control modules of all of the plurality of controllers are not permitted to obtain the first encoded information and the instant first identification information of each of the non-connected user mobile devices, wherein the control module of each of the plurality of controllers is permitted to use the decoding key to decode the first encoded information, obtaining the authenticated initial first identification information contained in the first encoded information, wherein when the control module of each of the plurality of controllers identifies that the authenticated initial first identification information of the connected user mobile device is identical to the instant first identification information and identifies that the control device identification number in the first encoded information is identical to the control device identification number in the main memory, the control module of each of the plurality of controllers sets the correspondingly connected control device to be in the open state, and wherein when the control module of each of the plurality of controllers identifies that the authenticated initial first identification information of the connected user mobile device is not identical to the instant first identification information or identifies that the control device identification number in the first encoded information is not identical to the control device identification number in the main memory, the control module of each of the plurality of controllers sets the correspondingly connected control device to be in the locked state.

17. The control system as claimed in claim 16, with each of the plurality of controllers further including a time module electrically connected to the control module, with the time module providing a date and a time, with the second wireless transmission module of one of the plurality manager mobile devices in connection with the wireless transmission device of one the plurality of controllers whose control module is in the reset state, the connected manager mobile device and the time module of the connected controller are synchronized such that the time and the date of the time module of the connected controller are consistent with a time and a date of the connected manager mobile device, wherein each of the plurality of manager mobile devices uses the encoding key to encode the authenticated initial first identification information, the control device identification number, an access permission start time, and an access permission end time as the first encoded information, wherein after the control module of one of the plurality of controllers has obtained the first encoded information of the connected user mobile device and the instant first identification information, the decoding key is used to decode the first encoded information to obtain the authenticated initial first identification information, the control device identification number, the access permission start time, and the access permission end time contained in the first encoded information, wherein when the control module of the one of the plurality of controllers identifies that the authenticated initial first identification information of the connected user mobile device is identical to the instant first identification information, identifies that the time of the time module of the one of the plurality of controllers is between the access permission start time and the access permission end time, and identifies that the control device identification number in the first encoded information is identical to the control device identification number in the main memory, the control module of the controller sets the connected control device to be in the open state, and wherein when the control module of the one of the plurality of controllers identifies that the authenticated initial first identification information of the connected user mobile device is not identical to the instant first identification information, identifies that the time of the time module of the one of the plurality of controllers is not between the access permission start time and the access permission end time, or identifies that the control device identification number in the first encoded information is not identical to the control device identification number in the main memory, the control module of the one of the plurality of controllers sets the correspondingly connected control device to be in the locked state.

18. The control system as claimed in claim 16, with each of the plurality of user mobile devices having a first hardware identification number, with the first hardware identification numbers of the plurality of user mobile devices different from each other, with the first wireless transmission module of one of the plurality of user mobile devices in connection with the second wireless transmission module of one of the plurality of manager mobile devices, the connected manager mobile device is permitted to obtain the first hardware identification number and the initial first identification information of the connected user mobile device, the connected manager mobile device executes the authentication procedure to generate an authenticated first hardware identification number and authenticated initial first identification information, and the encoding key is used to encode the authenticated first hardware identification number, the control device identification number, and the authenticated initial first identification information as the first encoded information, wherein every time one of the user mobile devices executes the access program and is in connection with the wireless transmission device and the first wireless transmission module, the access program of the connected user mobile device obtains the instant first hardware identification number of the connected user mobile device, with none of the first wireless transmission modules of the plurality of user mobile devices in connection with the second wireless transmission modules of the plurality of manager mobile devices, the manager mobile devices are not permitted to obtain the initial first identification information and the first hardware identification number of each of the plurality of user mobile devices, with the first wireless transmission module of one of the plurality of user mobile devices in connection with the wireless transmission device of one of the plurality of controllers, the control module of the connected controller is permitted to obtain an instant first hardware identification number of the connected user mobile device, with none of the first wireless transmission modules of the plurality of user mobile devices in connection with the wireless transmission devices of the plurality of controllers, the control modules of the plurality of controllers are not permitted to obtain the instant first hardware identification number of each of the plurality of user mobile devices, wherein when the control module of one of the plurality of controllers identifies that the authenticated initial first identification information of the connected user mobile device is identical to the instant first identification information, identifies that the authenticated first hardware identification number of the connected user mobile device is identical to the instant first hardware identification number, and identifies that the control device identification number in the first encoded information is identical to the control device identification number in the main memory, the control module of the one of the plurality of controllers sets the correspondingly connected control device to be in the open state, and wherein when the control module of the one of the plurality of controllers identifies that the authenticated initial first identification information of the connected user mobile device is not identical to the instant first identification information, identifies that the authenticated first hardware identification number of the connected user mobile device is not identical to the instant first hardware identification number, or identifies that the control device identification number in the first encoded information is not identical to the control device identification number in the main memory, the control module of the one of the plurality of controllers sets the correspondingly connected control device to be in the locked state.

19. The control system as claimed in claim 18, wherein when the second wireless transmission module of one of the plurality of manager mobile devices is in connection with the wireless transmission device of one of the plurality of controllers that has been granted with management authority, the connected manager mobile device is permitted to send the first hardware identification number of selected at least one of the plurality of user mobile devices to the main memory and is permitted to store the first hardware identification number of the selected at least one of the plurality of user mobile devices in the main memory of one of the plurality of controllers that has been granted with management authority, establishing a black list, wherein when the second wireless transmission module of one of the plurality of manager mobile devices is connected to the wireless transmission device of one of the plurality of controllers that has not been granted with management authority, the manager mobile device is not permitted to establish the black list, wherein when the control module of the one of the plurality of controllers obtains the first encoded information and the instant first hardware identification number of one of the plurality of user mobile devices, the control module of the one of the plurality of controllers identifies whether the instant first hardware identification number is in the black list, wherein when the instant first hardware identification number of the one of the plurality of user mobile devices is in the black list, the control module of the one of the plurality of controllers does not use the decoding key to decode the first encoded information, and the connected control device is in the locked state, and wherein when instant first hardware identification number of the one of the plurality of user mobile devices is not in the black list, the control module of the one of the plurality of controllers uses the decoding key to decode the first encoded information.

20. The control system as claimed in claim 16, wherein a number of the controllers controlled by one of the plurality of manager mobile devices is different from a number of controllers controlled by another of the plurality of manager mobile devices.

* * * * *